United States Patent
Ishikawa et al.

(10) Patent No.: US 9,821,649 B2
(45) Date of Patent: Nov. 21, 2017

(54) IN-WHEEL MOTOR DRIVING DEVICE

(71) Applicant: NTN CORPORATION, Osaka (JP)

(72) Inventors: Aiko Ishikawa, Shizuoka (JP); Ken Yamamoto, Shizuoka (JP); Tetsuya Yamamoto, Shizuoka (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 14/432,544

(22) PCT Filed: Sep. 30, 2013

(86) PCT No.: PCT/JP2013/076490
§ 371 (c)(1),
(2) Date: Mar. 31, 2015

(87) PCT Pub. No.: WO2014/054559
PCT Pub. Date: Apr. 10, 2014

(65) Prior Publication Data
US 2015/0231959 A1    Aug. 20, 2015

(30) Foreign Application Priority Data

Oct. 3, 2012    (JP) ................ 2012-221404

(51) Int. Cl.
*B60K 7/00* (2006.01)
*B60K 17/14* (2006.01)

(52) U.S. Cl.
CPC .......... *B60K 7/0007* (2013.01); *B60K 17/145* (2013.01); *B60K 2007/0061* (2013.01)

(58) Field of Classification Search
CPC ....... B60K 1/00; B60K 7/0007; B60K 7/0015

USPC .............................................. 180/65.51, 65.1
See application file for complete search history.

(56) References Cited

U.S. PATENT DOCUMENTS

| 4,162,713 A | * | 7/1979 | Heitman | ............... B60K 7/0015 |
| | | | | 180/242 |
| 5,691,584 A | | 11/1997 | Toida et al. | |
| 5,924,506 A | * | 7/1999 | Perego | ................. B60K 7/0007 |
| | | | | 180/252 |
| 6,186,262 B1 | * | 2/2001 | Mann | ................... B60K 7/0015 |
| | | | | 180/308 |

(Continued)

FOREIGN PATENT DOCUMENTS

| CN | 1922047 | 2/2007 |
| JP | 2002-37094 | 2/2002 |

(Continued)

OTHER PUBLICATIONS

Notification of Reasons for Refusal dated Feb. 21, 2017 in corresponding Japanese Application No. 2012-221404 (with English translation).

(Continued)

*Primary Examiner* — Hau V Phan
(74) *Attorney, Agent, or Firm* — Wenderoth, Lind & Ponack, L.L.P.

(57) ABSTRACT

A gear shaft of an output gear in a speed reducer of an in-wheel motor driving device is supported at a first end thereof and a second end thereof with respect to a housing. The gear shaft of the output gear is formed with a spline hole. The spline hole provides a spline-connection with an output shaft of a wheel hub.

9 Claims, 6 Drawing Sheets

(56) References Cited

U.S. PATENT DOCUMENTS

| | | | |
|---|---|---|---|
| 7,249,644 B2* | 7/2007 | Honda | B60K 1/00 180/22 |
| 7,270,204 B2* | 9/2007 | Taniguchi | B60K 7/0007 180/65.51 |
| 7,350,606 B2* | 4/2008 | Brill | B60K 7/0007 180/65.51 |
| 7,537,071 B2* | 5/2009 | Kamiya | B60G 3/20 180/298 |
| 7,641,010 B2* | 1/2010 | Mizutani | B60K 7/0007 180/65.1 |
| 8,002,060 B2* | 8/2011 | Komatsu | B60K 7/0007 180/65.51 |
| 8,261,866 B2* | 9/2012 | Ishida | B60K 7/0007 180/65.51 |
| 2002/0017420 A1 | 2/2002 | Kinme et al. | |
| 2004/0080223 A1* | 4/2004 | Shimizu | B60K 7/0007 310/75 C |
| 2007/0181357 A1 | 8/2007 | Saito et al. | |
| 2008/0289891 A1* | 11/2008 | Yogo | B60G 3/20 180/65.51 |
| 2009/0101425 A1* | 4/2009 | Laurent | B60G 3/01 180/65.51 |
| 2009/0154864 A1 | 6/2009 | Komori et al. | |
| 2012/0041661 A1* | 2/2012 | Kaneko | B60T 1/062 701/70 |
| 2013/0276567 A1 | 10/2013 | Odajima | |
| 2014/0144718 A1* | 5/2014 | Mair | B60K 7/0007 180/55 |

FOREIGN PATENT DOCUMENTS

| | | |
|---|---|---|
| JP | 2002-266987 | 9/2002 |
| JP | 2008-121813 | 5/2008 |
| JP | 2008-174020 | 7/2008 |
| JP | 2009-190440 | 8/2009 |
| JP | 2012-72873 | 4/2012 |
| JP | 2013-71685 | 4/2013 |
| JP | 2013-210056 | 10/2013 |
| WO | 2005/023575 | 3/2005 |

OTHER PUBLICATIONS

International Preliminary Report on Patentability dated Apr. 16, 2015 in International (PCT) Application No. PCT/JP2013/076490, together with English translation thereof.

International Search Report (ISR) dated Dec. 10, 2013 in International (PCT) Application No. PCT/JP2013/076490.

* cited by examiner

IN-WHEEL MOTOR DRIVING DEVICE

TECHNICAL FIELD

The present invention relates to an in-wheel motor driving device which includes an electric motor disposed in an internal space of a wheel, and a wheel hub connected to the electric motor via a speed reducer.

BACKGROUND ART

An in-wheel motor driving device typically has their drivetrain connected directly to a component near a tire, and because of this, the device is subject to a bending moment caused by a lateral force, such as a turning load from the tire, exerted onto an output gear of the speed reducer.

This bending moment can move a gear shaft out of alignment, which in turn will affect gear meshing operation, which then may result in uneven gear contact, leading to such problems as abnormal noise and wear.

In an attempt to eliminate these problems, a conventional solution is to provide a large mesh clearance between the teeth so that there will not be abnormal interference even if the gear shaft comes out of alignment (Patent Literature 1).

CITATION LIST

Patent Literature

Patent Literature 1: JP-A 2012-72873 Gazette

Technical Problem

However, while a large teeth mesh clearance may give a solution to abnormal interference, it does not provide any solution to the problem of gear shaft which becomes out of alignment, so the root cause of the problems is not eliminated.

Another problem with the conventional solution is that a large teeth mesh clearance decreases efficiency while it also poses concerns with regard to operating noise, vibration and harshness which are considered as the three primary factors that governs riding comfort of automobiles.

SUMMARY OF INVENTION

It is therefore an object of the present invention to provide an in-wheel motor driving device of an improved structure which has less likelihood for the gear shaft to become out of alignment even if the output gear of the speed reducer comes under a bending moment caused by a lateral force such as a turning load from a tire.

Solution to Problem

In order to achieve the object, the present invention provides an in-wheel motor driving device which includes: an electric motor disposed in an internal space of a wheel; and a wheel hub connected to the electric motor via a speed reducer. In this device, the speed reducer includes an output gear having a gear shaft supported at its two ends with respect to a housing. Further, the double-end supported gear shaft of the output gear is formed with a spline hole for spline-connection with an output shaft of the wheel hub.

Also, the output shaft of the wheel hub, which is spline-connected to the output gear of the speed reducer, may be formed with a small-diameter portion which is weakest in torsional strength, so that the small-diameter portion will be broken in case an excessive load is applied to the output shaft. As the small-diameter portion of the output shaft breaks, unsafe consequences such as a locked tire is avoided, and critical parts such as gears in the speed reducer and the electric motor are protected from damage.

Advantageous Effects of Invention

According to the present invention, the output gear has its gear shaft supported at its two ends with respect to a housing as has been described. Therefore, the invention makes the gear shaft less likely to come out of alignment even if a bending moment is exerted from the output shaft of the wheel hub to the output gear. Also, even if an external force such as a lateral force from the tire causes the output shaft of the wheel hub to develop a shaft deflection (deformation, displacement), such a deformation/displacement is absorbed by a gap between the splines which provide connection between the output shaft of the wheel hub and the output gear. This decreases stress to surrounding parts, providing greater freedom in designing component parts.

Also, by forming a small-diameter portion which is weakest in torsional strength, in the wheel hub's output shaft which is spline-connected to the output gear of the speed reducer, so that the small-diameter portion will be broken in case an excessive load is applied to the output shaft, it becomes possible to avoid unsafe consequences such as a locked tire, and protect critical parts such as gears in the speed reducer and the electric motor, from damage.

DESCRIPTION OF EMBODIMENTS

Hereinafter, embodiments of the present invention will be described based on the attached drawing.

Figure 6:
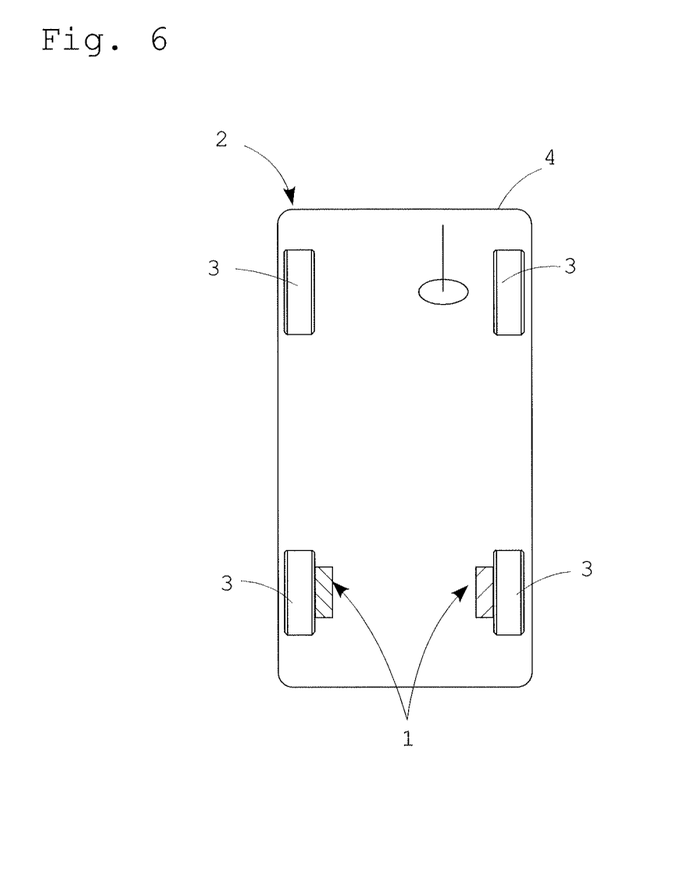
FIG. 6 is a schematic illustration which shows a state where an in-wheel motor driving device is installed onto a body of a vehicle.

As shown in FIG. 6, an in-wheel motor driving device 1 is installed in an internal space of a wheel 3 of an automobile 2. Although FIG. 6 shows an electric vehicle which uses its rear wheels as driving wheels, the present invention is not limited to this, and the automobile may use its front wheels as its driving wheels or it may be a four-wheel drive vehicle. The term "electric vehicle" used in the present DESCRIPTION refers to any electrically driven automobiles, including hybrid cars for example. In FIG. 6, a reference symbol 4 indicates an automobile body.

Figure 1:
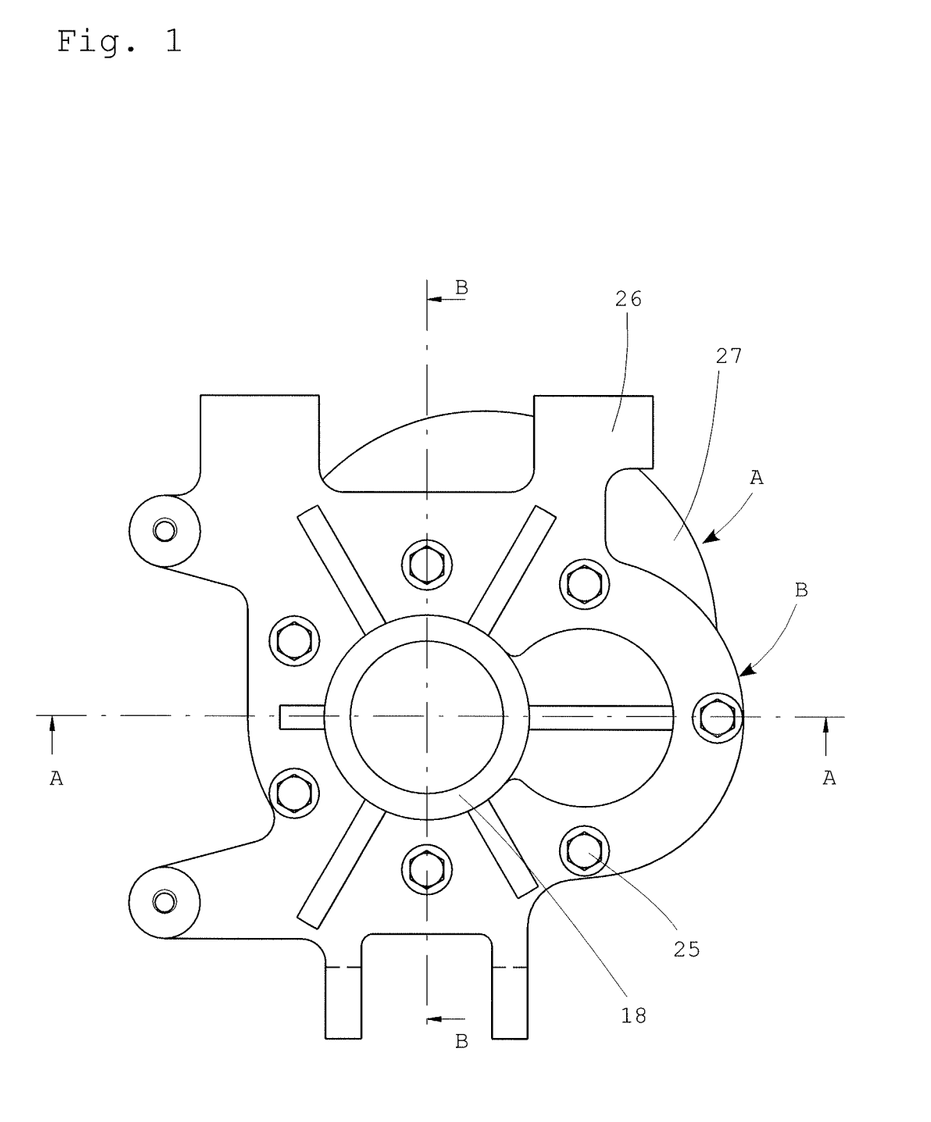
FIG. 1 is a front view which shows a speed reducer and an electric motor, of an in-wheel motor driving device according to a first embodiment of the present invention.
Figure 2:
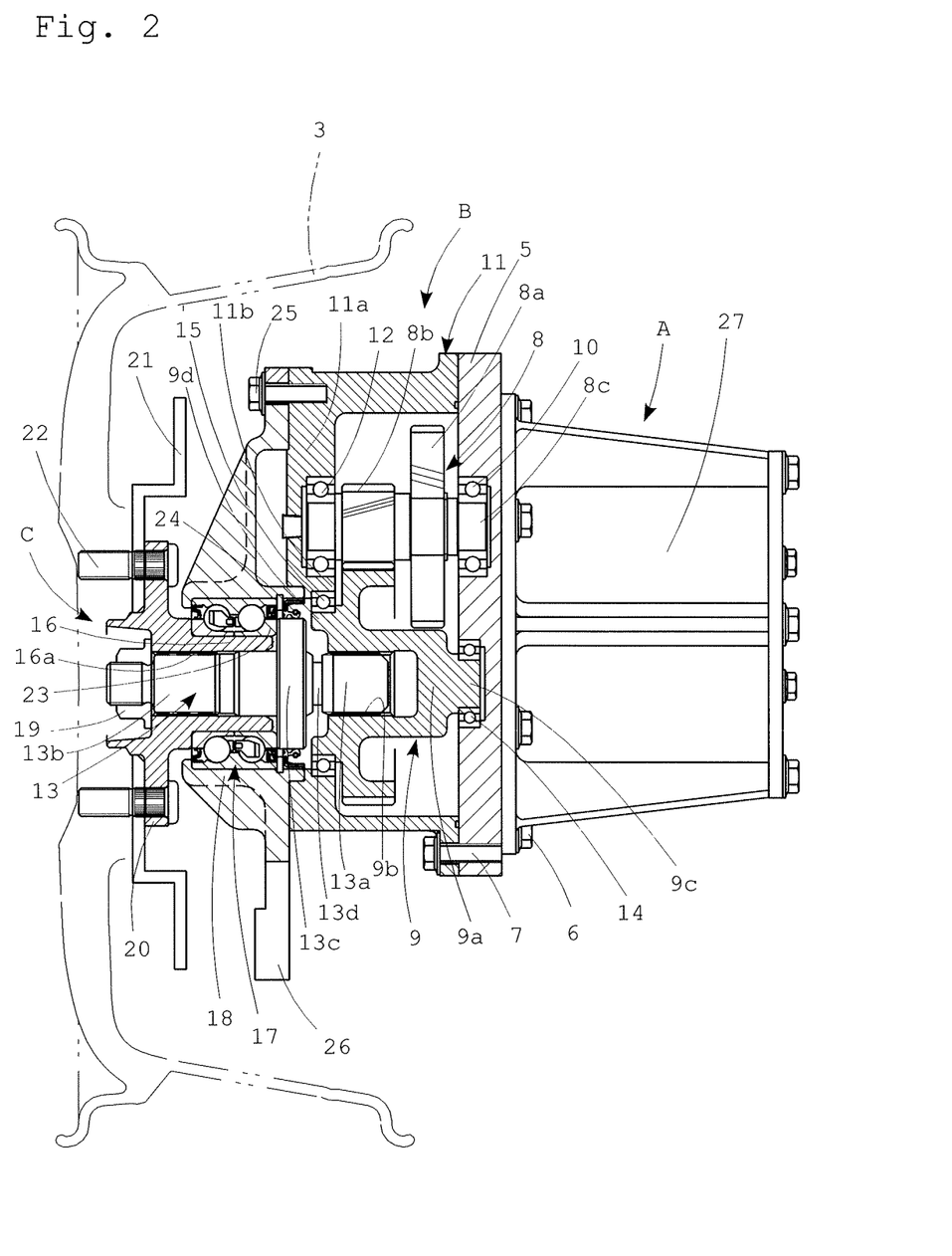
FIG. 2 is a sectional view taken in lines A-A in FIG. 1 which shows the first embodiment of the present invention.
Figure 3:
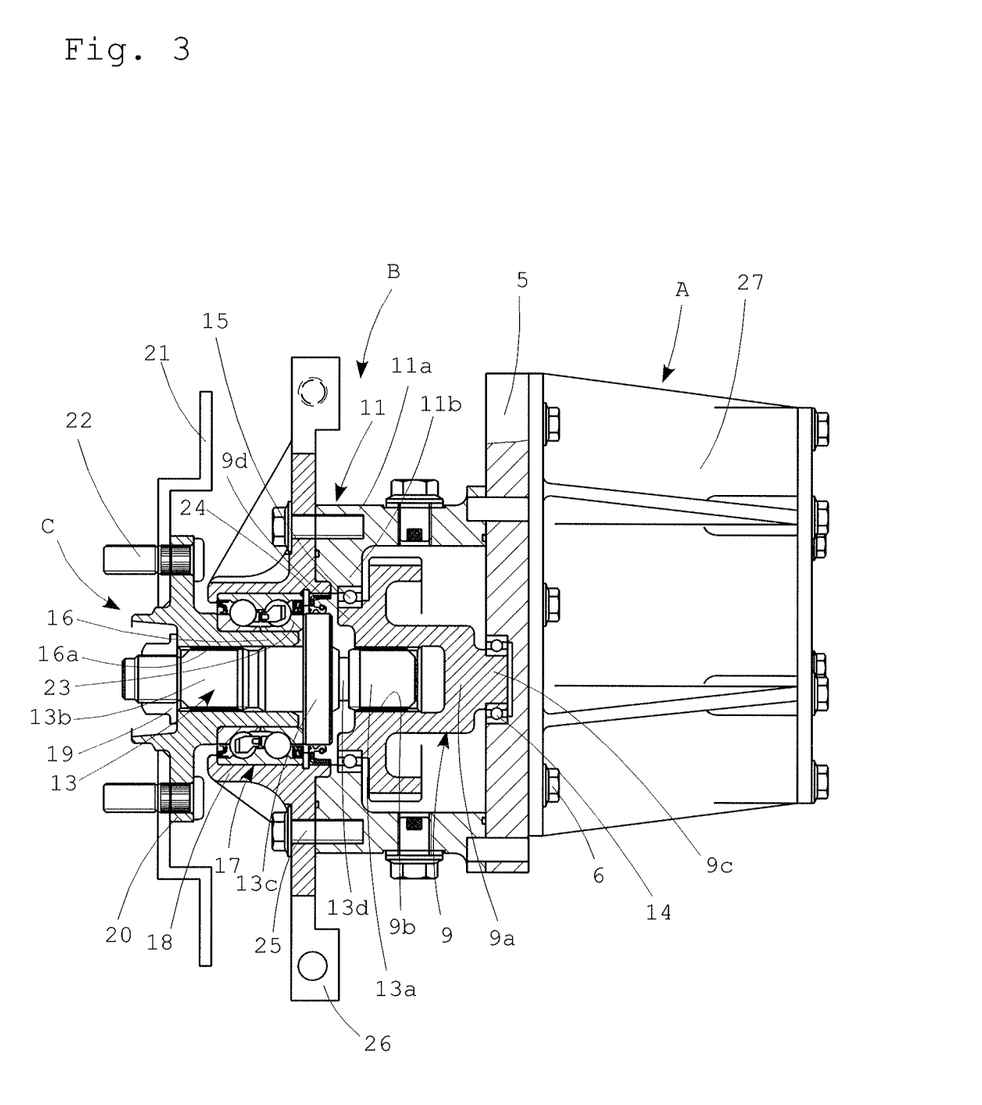
FIG. 3 is a sectional view taken in lines B-B in FIG. 1 which shows the first embodiment of the present invention.

The embodiment shown in FIG. 1 through FIG. 3 uses in-wheel motor driving devices 1 each including an electric motor A which generates a driving force; a speed reducer B which reduces revolution speed of the electric motor A and outputs a converted driving force; and a wheel hub C which transmits the output from the speed reducer B to the wheel 3.

The in-wheel motor driving device 1 according to the embodiment in FIG. 1 through FIG. 3 includes an intermediate plate 5 disposed between the electric motor A and the speed reducer B. The intermediate plate 5 has an inboard surface mounted with the electric motor A and an outboard surface mounted with the speed reducer B, detachably/attachably with bolts 6, 7 respectively.

In the present invention, the term "outboard" refers to an outer side (left side in FIG. 2) of the vehicle, whereas the term "inboard" refers to an inner side (right side in FIG. 2) of the vehicle.

The electric motor A may be provided by, for example, a radial gap motor, an axial gap motor or any other motor of an appropriate type.

The speed reducer B is provided by a two-stage parallel gear speed reducer, which includes a counter gear 8 meshing with an output gear of the electric motor A, and an output gear 9 meshing with the counter gear 8.

The counter gear 8 has a large-diameter gear 8a meshing with an output gear of the electric motor A and a small-diameter gear 8b meshing with the output gear 9. The counter gear 8 also has a gear shaft 8c, which has an inboard-side end portion supported by the outboard surface of the intermediate plate 5 via a rolling bearing 10, and an outboard-side end portion supported by a forward end wall 11a of a housing 11 of the speed reducer B via a rolling bearing 12.

The output gear 9 has a gear shaft 9a, which has an outboard side formed with a spline hole 9b having its inner circumferential surface formed as splines for insertion of an inboard-side end portion of an output shaft 13 of the wheel hub C. The inboard-side end portion of the output shaft 13 of the wheel hub C is formed with splines 13a and is inserted into the spline hole 9b, making a spline-connection.

The gear shaft 9a of the output gear 9 has its inboard-side end portion formed with a small-diameter boss portion 9c, and its outboard-side end portion formed with a flange portion 9d having a larger diameter than that of the gear shaft 9a. The inboard-side boss portion 9c of the gear shaft 9a is supported in the intermediate plate 5 by a rolling bearing 14, whereas the outboard-side flange portion 9d of the gear shaft 9a is supported in a flange section 11b which is formed to oppose to the flange portion 9d on the forward end wall 11a of the housing 11 of the speed reducer B, by a rolling bearing 15.

The gear shaft 9a of the output gear 9 in the speed reducer B is supported at its both ends with respect to the housing 11 by the rolling bearing 14 on the inboard side and the rolling bearing 15 on the outboard side. Therefore, the gear shaft 9a is not very much likely to become out of alignment even if there is a bending moment exerted from the output shaft 13 of the wheel hub C onto the output gear 9. Also, even if an external force such as a lateral force from the tire causes the output shaft 13 of the wheel hub C to develop a shaft deflection (deformation, displacement), such a deformation/displacement is absorbed by a gap between the splines 13a of the output shaft 13 in the wheel hub C and the spline hole 9b on the inner diameter surface of the output gear 9. This decreases stress to surrounding parts, providing greater freedom in designing component parts.

Comparing the inboard-side rolling bearing 14 which supports the gear shaft 9a of the output gear 9, and the outboard-side rolling bearing 15 to each other, the outboard-side rolling bearing 15 is closer to the center of gravity and to a load point of driving force, than the inboard-side rolling bearing 14. In order to compensate for this, the outboard-side rolling bearing 15 is given a larger PCD than is the inboard-side rolling bearing 14 for increased load capacity. This makes it possible to optimize the supporting structure for the gear shaft 9a of the output gear 9.

The wheel hub C has a so called first-generation structure constituted by an inner member 16 which has an inner diameter surface formed with splines 16a for spline-connection with splines 13b formed on an outboard-side end portion of the output shaft 13; and an outer member 18 coaxially fitted around an outer diameter side of the inner member 16, with a multiple-row hub bearing 17 in between. The inner member 16 has an inner-diameter space fitted with the splines 13b of the output shaft 13, and is fixed to the output shaft 13 with a nut 19 which is screwed around a tip portion of the output shaft 13. The inner member 16 is integrally formed with a wheel mounting flange 20, and to this wheel mounting flange 20, a brake rotor 21 and the wheel 3 are secured with bolts 22.

The output shaft 13 has a precompression flange 13c contacting an inboard-side end surface of an inner ring 23 of the hub bearing 17. As the nut 19 is tightened around the tip portion of the output shaft 13, a precompression is applied to the inner ring 23 of the hub bearing 17.

An oil seal 24 is provided between an outer circumferential surface of the precompression flange 13c and an inner circumferential surface of the inboard-side end portion of the outer member 18, to keep inside the speed reducer B sealed.

Between the splines 13b in the output shaft 13 which is spline-connected to the inner diameter surface of the inner member 16 of the wheel hub C and the splines 13a of the output shaft 13 which is spline-connected into the spline hole 9b of the output gear 9 of the speed reducer B, a small-diameter portion 13d is formed as a portion which has the weakest torsional strength over the entire length of the output shaft 13.

By forming the small-diameter portion 13d which is weakest in torsional strength along the entire length of the output shaft 13, the output shaft 13 is expected to be broken at the small-diameter portion 13d in case an excessive load is applied. As the small-diameter portion 13d breaks, unsafe consequences such as a locked tire is avoided, and critical parts such as gears in the speed reducer B and the electric motor A are protected from damage.

The outer member 18 is fixed to the forward end wall 11a in the housing 11 of the speed reducer B, with bolts 25. The outer member 18 is integrally formed with knuckles 26 which serve as vehicle body mounting members.

Figure 4:
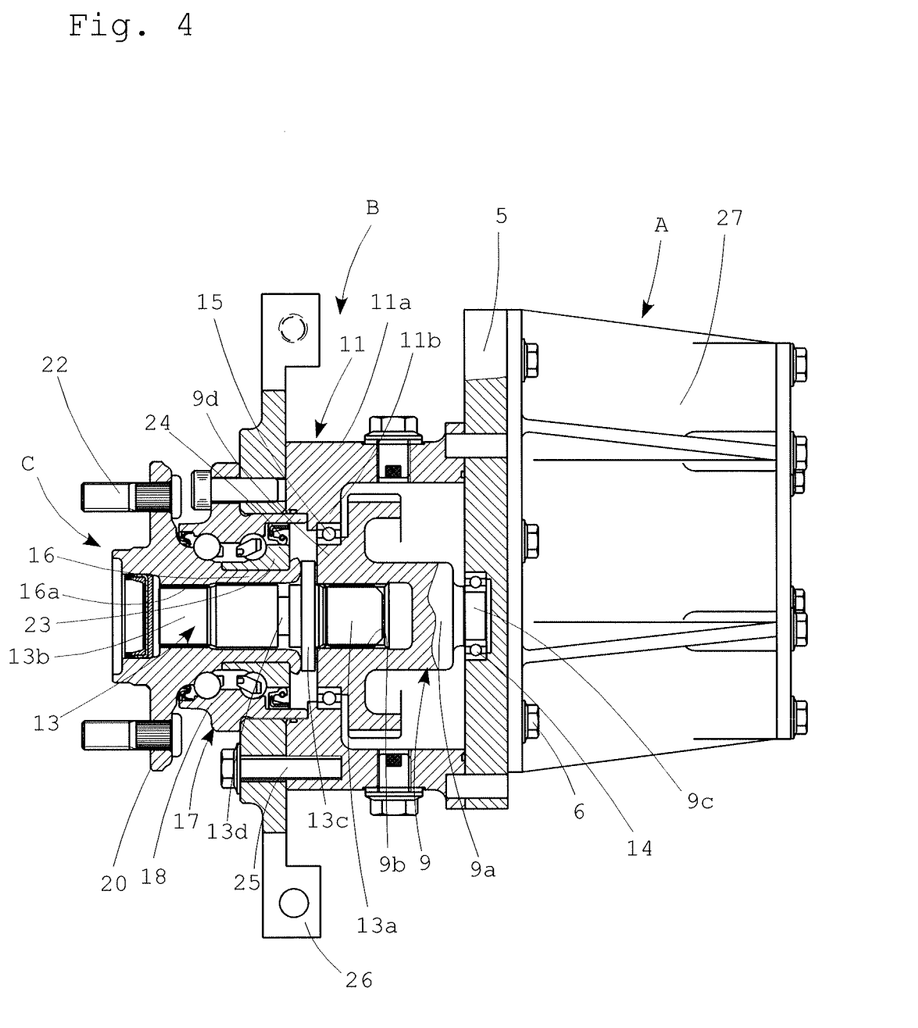
FIG. 4 is a sectional view which shows a second embodiment of the present invention.

Next, FIG. 4 shows an embodiment in which the wheel hub C is of a so called third generation. The multiple-row hub bearing 17 has its outboard inner ring track formed integrally with the inner member 16. Also, a plurality of outer ring track surfaces of the hub bearing 17 are formed integrally in the inner diameter surface of the outer member 18.

In the embodiment shown in FIG. 4, the multiple-row hub bearing 17 has its inboard-side inner ring 23 crimped by an inboard-side end portion of a cylindrical section in the inner member 16, so that a precompression is applied to the inner ring 23 by this crimp fixing.

Figure 5:
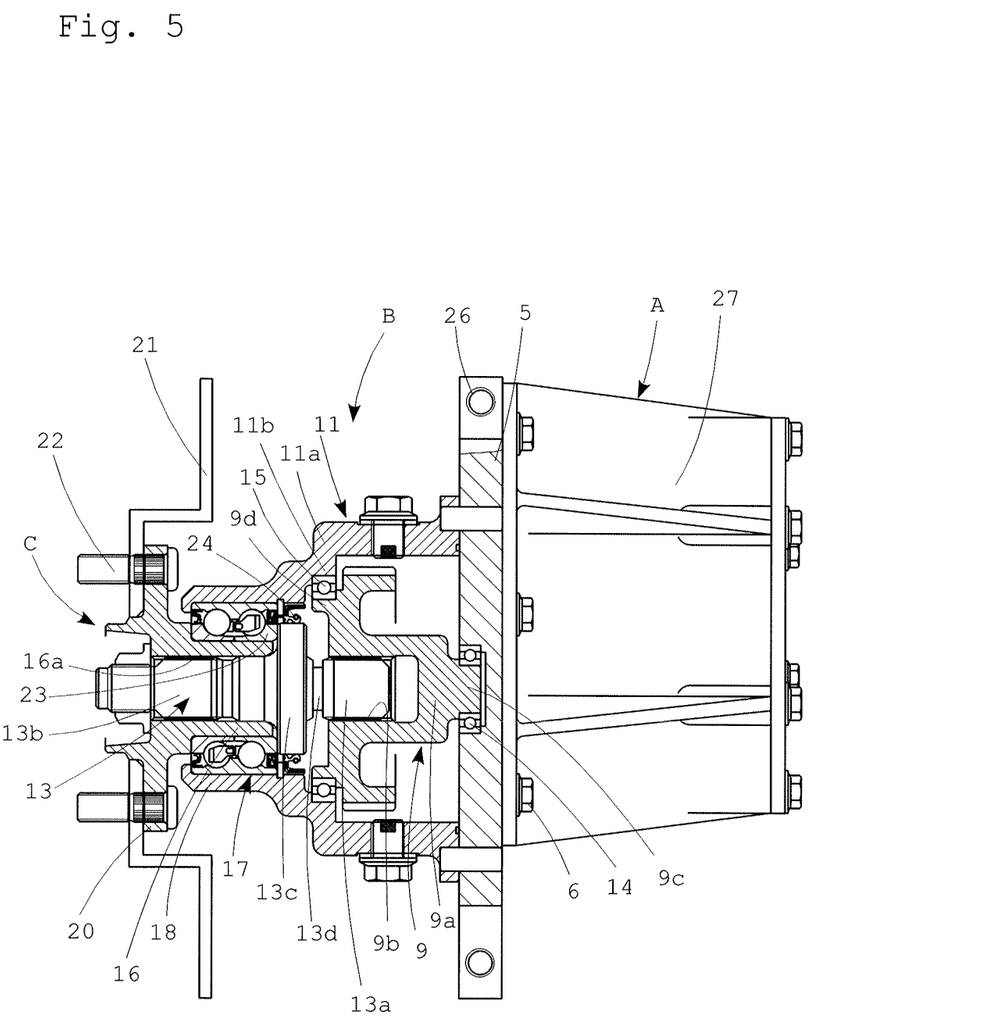
FIG. 5 is a sectional view which shows a third embodiment of the present invention.

Next, FIG. 5 shows an embodiment in which the wheel hub C is of the first generation, but the outer member 18 and a housing 11 of the speed reducer B are formed integrally with each other. In the present embodiment, the intermediate plate 5 is made of steel, and the intermediate plate 5 is formed with knuckles 26 which serve as vehicle body mounting members.

Further, in the embodiment shown in FIG. 5, the housing 11 of the speed reducer B which are formed integrally with the outer member 18 and a motor case 27 of the electric motor A are made of an alloy of a light metal such as aluminum for weight reduction.

In cases where the housing 11 of the speed reducer B and the motor case of the electric motor A are formed of a dissimilar metal like in the embodiment shown in FIG. 5, electrolytic corrosion can be a problem on contact surfaces of the dissimilar metals. Therefore, it is desirable that the contact surfaces of the dissimilar metals are treated with trivalent chromate to protect from the electrolytic corrosion.

Other possible treatments to provide protection from the electrolytic corrosion include the followings:
- Hexavalent-chromium-free chromating (containing chromium nitrate or chromium sulfate as a primary components)
- Zn—Ni plating
- Zinc chromate coating or aluminum paint
- DISGO coating
- Almite or boehmite Still other options include use of an insulation member inserted between the two metals, and any other appropriate measures to prevent electrolytic corrosion.

Each of the embodiments described above makes use of components of complicated shapes such as the output gear 9 which has the spline hole 9b formed on its inner circumferential surface. These can be manufactured inexpensively if sintering formation techniques are employed.

The present invention being described with reference to the drawings thus far, the present invention is not limited to those embodiments illustrated in the drawings. Any of the embodiments illustrated in the drawings may be modified and/or varied in many ways within the scope of the present invention or within an equivalent range of scope therewith.

REFERENCE SIGNS LIST

A Electric Motor
B Speed Reducer
C Wheel Hub
1 In-Wheel Motor Driving Device
2 Automobile
3 Wheel
4 Vehicle Body
5 Intermediate Plate
6, 7 Bolts
8 Counter Gear
8a Large-Diameter Gear
8b Small-Diameter Gear
8c Gear Shaft
9 Output Gear
9a Gear Shaft
9b Spline Hole
9c Boss Portion
9d Flange Portion
10 Rolling Bearing
11 Housing
11a Forward End Wall
11b Flange Section
12 Rolling Bearing
13 Output Shaft
13a Splines
14, 15 Rolling Bearings
16 Inner Member
17 Hub Bearing
18 Outer Member
19 Nut
20 Wheel Mounting Flange
21 Brake Rotor
22 Bolt
23 Inner Ring
24 Oil Seal
25 Bolt
26 Knuckle

The invention claimed is:

1. An in-wheel motor driving device comprising:
an electric motor disposed in an internal space of a wheel; and
a wheel hub connected to the electric motor via a speed reducer,
wherein:
the speed reducer is a parallel gear speed reducer disposed on an outboard side of the wheel with respect to the electric motor,
the parallel gear speed reducer includes an output gear having a gear shaft supported at two ends thereof with respect to a housing of the speed reducer,
an inner diameter surface of the gear shaft of the output gear is defined with a spline hole for spline-connection with an output shaft of the wheel hub, and
the spline hole is at a position overlapping with the output gear in a diametrical direction.

2. The in-wheel motor driving device according to claim 1, wherein the gear shaft of the output gear is supported by a bearing on the outboard side of the wheel and a bearing on an inboard side of the wheel, the bearing on the outboard side of the wheel having a greater load capacity than the bearing on the inboard side of the wheel.

3. The in-wheel motor driving device according to claim 2, further comprising an intermediate plate disposed between the electric motor and the speed reducer, wherein the electric motor is mounted on one surface of the intermediate plate, the speed reducer being mounted on another surface of the intermediate plate, and the intermediate plate having the bearing on the inboard side of the wheel which supports the gear shaft of the output gear.

4. The in-wheel motor driving device according to claim 1, wherein a small-diameter portion having a weakest torsional strength is formed between splines of the output shaft which is spline-connected to an inner diameter surface of the wheel hub and splines of the output shaft which is spline-connected to the spline hole of the output gear.

5. The in-wheel motor driving device according to claim 1, wherein the wheel hub, which is spline-connected to the output shaft, has an inner member thereof fixed by a nut screwed around an outboard-side tip portion of the output shaft, the wheel hub having a multiple-row hub bearing on an outer diameter side of the inner member, the multiple-row hub bearing including an inner ring having an inboard end surface thereof contacted by a precompression flange formed in the output shaft, the inner ring of the multiple-row hub bearing being pre-compressed by tightening the nut, via the precompression flange of the output shaft.

6. The in-wheel motor driving device according to claim 5, wherein a small-diameter portion is at a more inboard side than the precompression flange of the output shaft.

7. The in-wheel motor driving device according to claim 1, wherein the wheel hub has an outer member thereof formed integrally with the housing of the speed reducer.

8. The in-wheel motor driving device according to claim 7, wherein the housing of the speed reducer formed integrally with the outer member of the wheel hub is made of steel, the housing of the speed reducer having a vehicle body mounting portion, and an intermediate plate and a case of the electric motor being made of an alloy of a light metal.

9. The in-wheel motor driving device according to claim 1, wherein the speed reducer includes a sintered gear.

* * * * *